United States Patent [19]
Coffey

[11] 3,878,755
[45] Apr. 22, 1975

[54] ONE-PIECE SNAP-TOGETHER TOGGLE HEAD

[75] Inventor: Chase C. Coffey, Dallas, Tex.

[73] Assignee: The Firm of Dock & Dock, Arlington, Va. ; a part interest

[22] Filed: May 22, 1974

[21] Appl. No.: 472,096

[52] U.S. Cl. .................................................. 85/3 R
[51] Int. Cl. ............................................ F16b 13/04
[58] Field of Search ........... 85/3 R, 3 K, 3 S, 80, 85

[56] References Cited
UNITED STATES PATENTS

| | | | |
|---|---|---|---|
| 1,817,584 | 8/1931 | Rosenberg | 85/85 |
| 1,881,836 | 10/1932 | Mitchell | 85/80 |
| 2,224,023 | 12/1940 | Sayen et al. | 85/3 R |
| 2,998,743 | 9/1961 | Apfelzweig | 85/3 R |
| 3,170,361 | 2/1965 | Vaughn | 85/3 R |
| 3,213,745 | 10/1965 | Dwyer | 85/3 R |
| 3,532,024 | 10/1970 | Gutshall | 85/3 R |

*Primary Examiner*—Marion Parsons, Jr.

[57] ABSTRACT

This invention relates to a one-piece structure which may be formed into a toggle head by folding and snapping a pair of oppositely disposed wings into conjunction with trunnions integral with a central member having a bore therethrough for the accommodation of a toggle bolt, wherein the ribs connecting the wings to the central member form the spring elements of the structure.

10 Claims, 8 Drawing Figures

PATENTED APR 22 1975

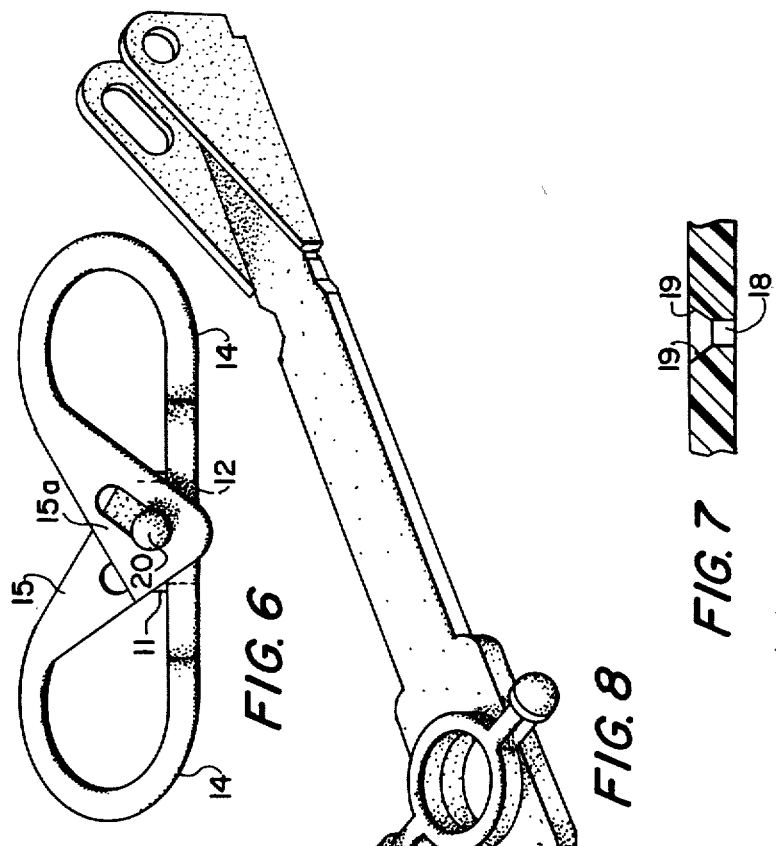

ONE-PIECE SNAP-TOGETHER TOGGLE HEAD

This invention constitutes an improvement in toggle heads used, for example, in securing articles retained on walls by bolts inserted through openings provided in such walls to connect the article on the one side of the wall with the toggle head on the other side thereof.

Among other uses, toggle fasteners are employed to secure articles mounted on the face of a wall by providing counterpressure on the reverse side of such wall, such pressure being controlled by the tightening of the toggle bolt. The toggle head which accomplishes the counterpressure may be any one of several types, the preferred form being a pair of oppositely disposed wings pivotally anchored upon a central threaded nut member, said nut being movable longitudinally upon the toggle bolt by the counterrotation of the nut and the bolt.

The conventional spring-type toggle head consists of a pair of wings extending in opposite directions from their pivotal anchorage to a nut which engages the toggle bolt, and a spring holding the wings in an expanded position away from the toggle bolt but permitting compression of the wings into substantial parallelism with the toggle bolt.

In the present invention the wings and nut are formed in a unitary structure with the connecting rib members therebetween providing the resilience of the springs in conventional toggle heads.

For a better understanding of the invention, reference is made to the accompanying drawings, in which:

FIG. 4 shows the first of said wings assembled onto the trunnions;

FIG. 5 shows the second wing partially raised preparatory to assembly; and

FIG. 6 is a side elevation of the toggle head, completely assembled.

In FIG. 7 there is shown a cross-section of an orifice in a wing, with chamfering of the edges of the orifice.

FIG. 8 shows another embodiment of this invention, wherein the wings are formed at an angle of approximately 90° from the plane of the ribs. Such angular positioning of the wings may be readily accomplished, for example, in producing the unit by the process of thermoplastic molding. It has the advantage of eliminating a part of the assembly operation (the bending of the wing tips) and thus reducing the cost of production.

Figure 1:
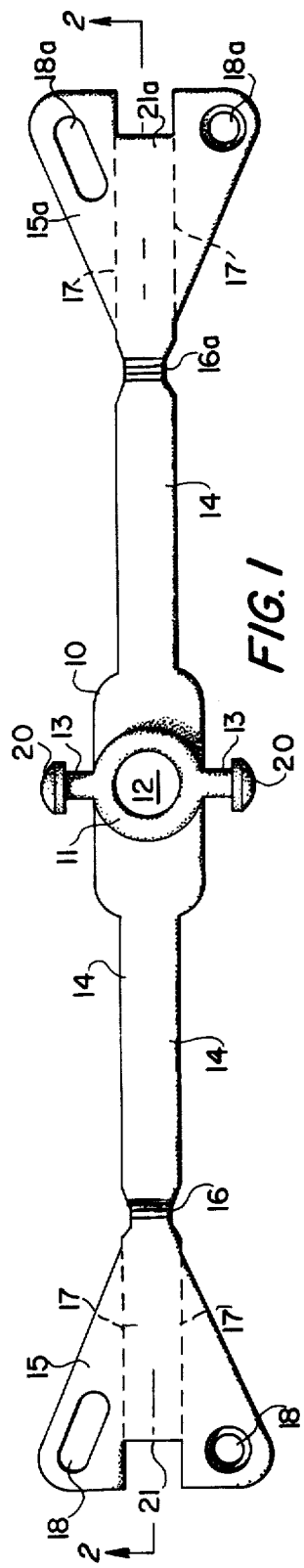
FIG. 1 is a top plan of the toggle head constituting the present invention.
Figure 2:
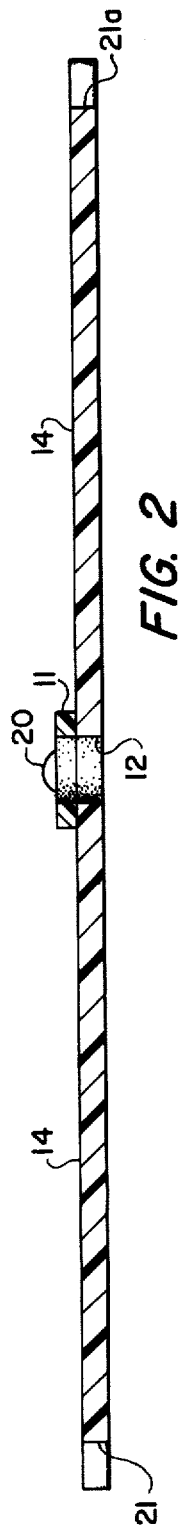
FIG. 2 is a cross-section taken on line 2—2 of FIG. 1.
Figure 3:
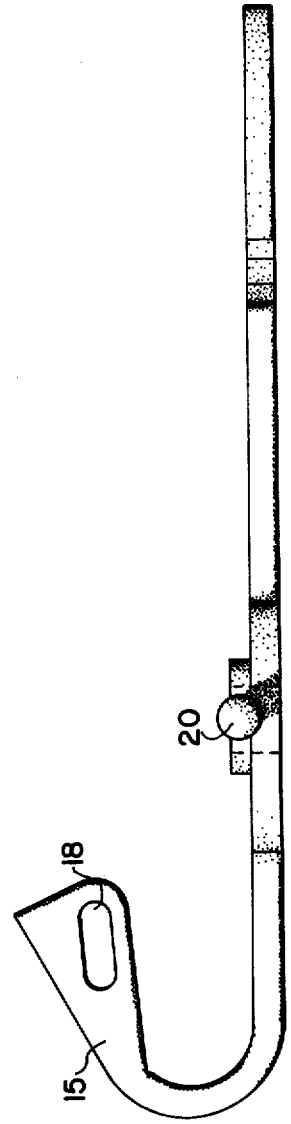
FIG. 3 shows in side elevation one of the wings of the toggle head in raised position preparatory to assembly.

Referring more particularly to the drawings:

The toggle head 10, shown extended in FIG. 1, comprises a section 11, substantially circular and having a central bore 12 and oppositely directed trunnions 13, 13; and outwardly extending upon the transverse axis and integral with said center section 11, a pair of oppositely extending ribs 14, 14. Connecting the outer ends of said ribs to wings 15 and 15a, respectively, are bending segments 16 and 16a, these latter being ribbed, webbed, or corrugated to provide flexibility and strength at the base of the respective wing members.

In the longitudinal axis of each wing there are provided parallel grooves 17 to permit ready bending of the wings in assembly, and orifices 18, which permit insertion of the trunnions on opposite sides of the center section. Such insertion is facilitated by chamfering the edges 19 of the orifices, and the wings are retained in secure assembly by nubs, or button-like termini 20 on the trunnions.

The assembly of this unit is accomplished by bending the small wing 15 until the orifices 18 make contact with the trunnion nubs 20, and pressing the wings into secure engagement. The large wings 15a is then bent in like manner, to permit its orifices 18a to engage with the trunnion nubs 20, bringing the two wings into direct contiguity on the trunnions.

The resilience of the rib members 14 and the bending segments 16 and 16a causes the wings to extend in substantial perpendicularity with respect to the bore 12 of the center section (through which the toggle bolt will be inserted), and the cutaway portions 21 and 21a of the respective wings permit the toggle head to be screwed tightly onto the toggle bolt. However, the flexibility of the entire unit allows partial folding of the wings so that the unit may be inserted through a small opening as in a wall, and the resilience of the material of which the product is made causes the wings to expand again, immediately upon release of the compression on them.

When the wings are molded to be positioned perpendicular to the plane of the ribs, the assembly of the unit is simplified and accelerated. The ribs are bent to bring the orifices in the wings into mating position with the termini 20 on trunnions 13, and lateral pressure on the wings causes the termini to slip through the orifices and lock the wings into toggle position.

One of the materials deemed well suited for use in making this unit is a flexible, resilient thermoplastic which may be readily molded into the desired contour and dimensions.

Having thus disclosed my invention, I claim:

1. In a unitary structure for a toggle head, the combination of a central member having a bore therethrough, and at the ends of one axis of said central member, oppositely directed rod-like rib members each terminating in a wing, and at each end of the perpendicular axis of said central member an anchoring trunnion for the retention of said wings upon bending of said rib members to place the outermost portions of said wings in juxtaposition with said central member.

2. The invention of claim 1 wherein said central member is formed having a thickness exceeding the thickness of the remainder of the unit, thus creating support for the walls of a bore of sufficient length to provide securing of a toggle bolt therethrough.

3. The invention of claim 1 wherein each said anchoring trunnion is provided with a nub-like terminus.

4. The invention of claim 1 wherein each wing has parallel grooves extending in the longitudinal axis thereof, to permit ready bending of the wings for assembly thereof onto the trunnions.

5. The invention of claim 1 wherein each wing is provided with a pair of orifices for receipt of said trunnions.

6. The invention of claim 5 wherein each said orifice is chamfered to facilitate entry therethrough of said respective trunnion nub.

7. The invention of claim 1 wherein each wing member is provided, at the point of its connection to the respective rib, with a segment contoured to create enhanced resilience.

8. The invention of claim 7 wherein said contoured segment is corrugated.

9. The invention of claim 7 wherein said contoured segment consists of cross-bars having the appearance of webbing.

10. The invention of claim 7 wherein said contoured segment consists of successive ridges.

* * * * *